United States Patent
Karam et al.

(10) Patent No.: US 10,005,271 B2
(45) Date of Patent: Jun. 26, 2018

(54) CHIPS WITH HERMETICALLY SEALED BUT OPENABLE CHAMBERS

(71) Applicants: Raymond Miller Karam, Santa Barbara, CA (US); Thomas Wynne, Santa Barbara, CA (US); Anthony Thomas Chobot, Goleta, CA (US)

(72) Inventors: Raymond Miller Karam, Santa Barbara, CA (US); Thomas Wynne, Santa Barbara, CA (US); Anthony Thomas Chobot, Goleta, CA (US)

( * ) Notice: Subject to any disclaimer, the term of this patent is extended or adjusted under 35 U.S.C. 154(b) by 0 days. days.

(21) Appl. No.: 15/237,965

(22) Filed: Aug. 16, 2016

(65) Prior Publication Data

US 2016/0354778 A1 Dec. 8, 2016

Related U.S. Application Data

(62) Division of application No. 14/270,265, filed on May 5, 2014, now Pat. No. 9,440,424.

(51) Int. Cl.
| | |
|---|---|
| *H01L 23/04* | (2006.01) |
| *B32B 43/00* | (2006.01) |
| *B32B 38/00* | (2006.01) |
| *B01L 3/00* | (2006.01) |

(52) U.S. Cl.
CPC ........ *B32B 43/006* (2013.01); *B01L 3/50273* (2013.01); *B32B 38/0008* (2013.01); *B32B 38/0036* (2013.01); *B32B 43/00* (2013.01); *B01L 2200/0689* (2013.01); *B01L 2300/0816* (2013.01); *B01L 2300/0887* (2013.01); *B01L 2400/0481* (2013.01); *B32B 2310/00* (2013.01); *B32B 2439/80* (2013.01); *B32B 2535/00* (2013.01); *Y10T 156/1195* (2015.01); *Y10T 156/1972* (2015.01)

(58) Field of Classification Search
CPC ........ B01L 3/50273; B01L 2200/0689; B01L 2300/0816; B01L 2300/0887; B01L 2400/0481; B32B 38/0008; B32B 43/00; B32B 43/006; B32B 38/0036; B32B 2310/00; H01L 24/03; H01L 24/72; H01L 24/98; H01L 23/10; H01L 23/573; A61J 2001/1431; A61J 2001/1425; A61J 2001/202; Y10T 156/1195; Y10T 156/1972
USPC ........................................................ 257/698
See application file for complete search history.

(56) References Cited

U.S. PATENT DOCUMENTS

| | | | |
|---|---|---|---|
| 2002/0137218 A1* | 9/2002 | Mian | B29C 59/14 436/45 |
| 2013/0115607 A1* | 5/2013 | Nielsen | C12Q 1/68 435/6.12 |

* cited by examiner

*Primary Examiner* — Tu-Tu Ho
(74) *Attorney, Agent, or Firm* — Shalini Venkatesh

(57) ABSTRACT

Embodiments generally relate to chips containing one or more hermetically sealed chambers that may be dismantled under controlled conditions using a release technique. In one embodiment a chip comprises a first hermetic seal bonding first and second elements to create a first chamber and a second hermetic seal bonding third and fourth elements to create a second chamber encompassing the first chamber. The first hermetic seal may be broken open independently of the second hermetic seal by the application of a mechanical or thermal technique.

6 Claims, 11 Drawing Sheets

CHIPS WITH HERMETICALLY SEALED BUT OPENABLE CHAMBERS

RELATED APPLICATIONS

This application is related to U.S. application Ser. No. 13/291,956, filed Nov. 8, 2011, published as U.S. Patent Publication No. 2013/0112650, which is incorporated herein in its entirety by reference. This application is a division of U.S. patent application Ser. No. 14/270,265, entitled "Methods to form and to dismantle hermetically sealed chambers", filed on May 5, 2014, which is hereby incorporated by reference, as if set forth in full in this specification.

BACKGROUND

Methods of storing, inserting, or managing fluids on a microfluidic chip currently rely either on an external reservoir, such as a syringe, from which the fluids may be delivered through a connecting assembly, such as a Luer adapter, or on the use of an on-chip reservoir such as a "blister pack", similar to the macro-scale versions used for packaging and dispensing drugs. The main disadvantages of the former approach include the relatively large footprint and operational inconvenience of the devices. The disadvantages of the latter approach typically include chemical incompatibility issues with the fluids, especially if the blister pack is made of a polymer and adhesives are used to create the seal, poor hermeticity of adhesive or gasket clamping, and poor control of the method of releasing the fluid when required.

Similar considerations apply to managing materials other than fluids that may need to be encapsulated on a chip, examples including materials comprising sensitive electronics, radioactive substances, medical radioactive substances, biological agents, etc.

It is therefore desirable to provide a method for creating hermetically sealed encapsulations or chambers for materials on chips that avoids the use of polymers or adhesives, and can be easily integrated with the microfabrication techniques used to create those chips, where the bond or bonds forming the encapsulations can be conveniently and controllably opened, broken, taken apart or un-sealed, as and when required. It is additionally desirable to provide a method for achieving the controlled release or exposure of the encapsulated materials as and when required. The chips may be microfluidic chips or flow cells.

In this disclosure, the terms "open", "break", "take apart" "unseal", "unbond", "cleave" and variants thereof are used to a large extent interchangeably, and are defined as referring to the deliberate dismantling of a bond formed between two elements of the chip in question, where the dismantling may involve a break at the bond interface within the material making up the bond itself, or a break in the bulk material of one or both of the chip elements immediately adjacent to the bond interface. The word "seal" as used throughout the disclosure is defined to mean the bond joint or bond interface where two substrates are fused together, for example by a room temperature laser bonding process, or fusion welding process, or using a low temperature glass frit bonding process.

SUMMARY

The present invention includes a method for forming a hermetically sealed chamber, the method comprising using room temperature laser bonding to create a hermetic seal between a first element and a second element to form the chamber. A bond interface of the hermetic seal is configured to allow the hermetic seal to be opened under controlled conditions using a release technique.

In one aspect, the chamber is formed within a chip. In another aspect, the chip is a microfluidic chip comprising a via connected to the chamber, wherein the chamber is configured to hold a fluid.

In yet another aspect, the release technique comprises a mechanical technique that creates sufficient tensile or shear force at the bond interface to overcome the strength of the bond interface.

In one aspect, a chip comprises a first hermetic seal bonding a first element and a second element to create a first chamber; and a second hermetic seal bonding a third element and a fourth element to create a second chamber encompassing the first chamber. The first hermetic seal may be broken open independently of the second hermetic seal by a mechanical or thermal technique.

In another aspect, an apparatus facilitating the opening of a hermetically sealed chamber included in a device comprises a fixture configured to hold the device, and a system configured to create sufficient tensile or shear stress at the bond interface to open a bond interface of the hermetically sealed chamber.

In another aspect, a method for opening a hermetic seal between a first element and a second element forming a chamber comprises using a release technique that creates sufficient tensile or shear stress at a bond interface of the hermetic seal of the chamber to open the hermetic seal. The release technique comprises introducing a tool to the vicinity of the bond interface without any contact occurring between the tool and any material within the chamber, and the breaking of the hermetic seal results in the complete separation of the first and second elements.

DETAILED DESCRIPTION

The manner in which the present invention provides its advantages can be more easily understood with reference to FIGS. 1 through 15.

Figure 1:
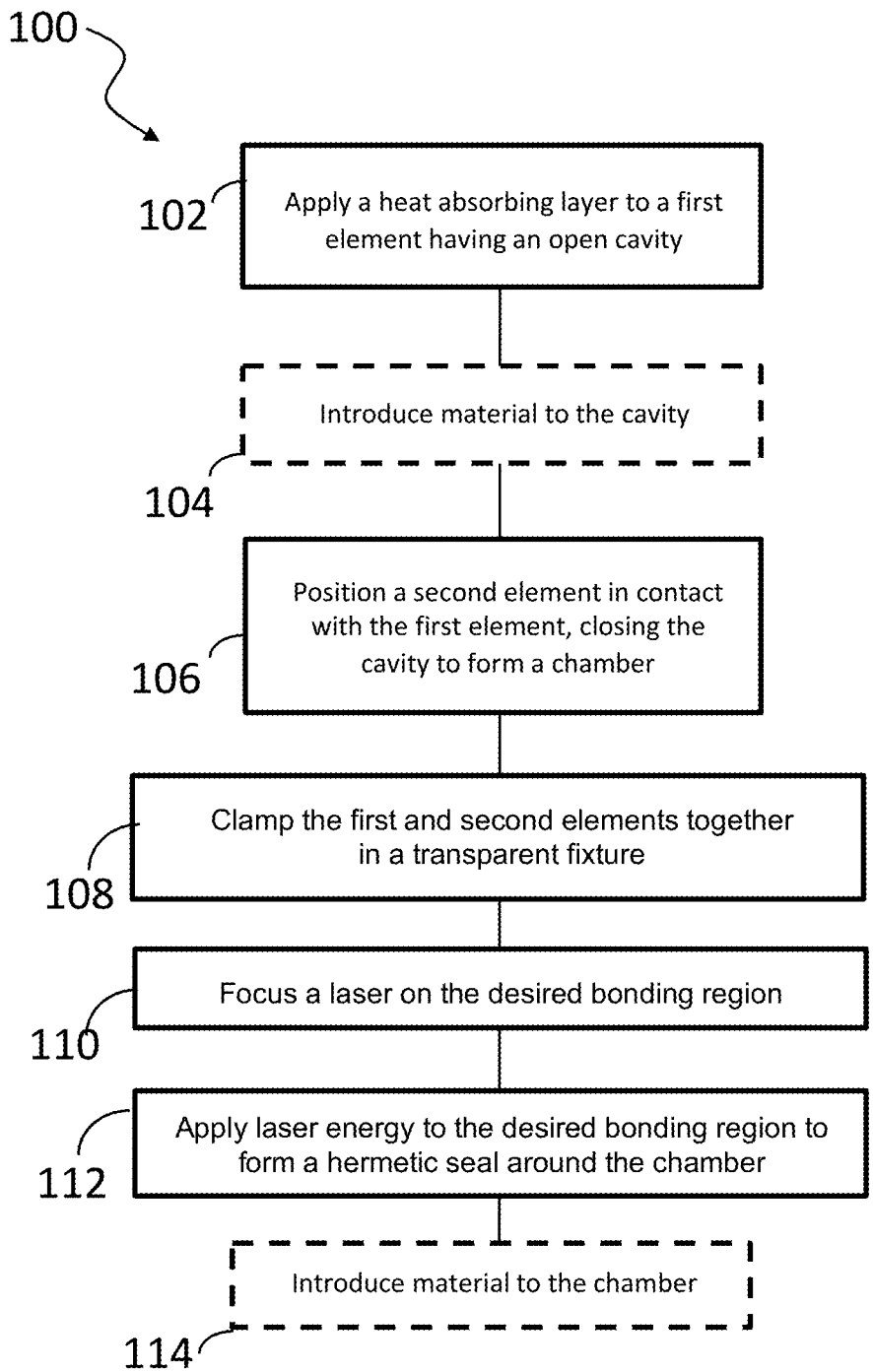
FIG. 1 is a flowchart of process steps for forming a hermetically sealed chamber according to one embodiment.

FIG. 1 is a flowchart of process steps for a method 100 of hermetically encapsulating a material on a chip according to one embodiment of the present invention. At step 102 a heat absorption layer is applied to an area of the top surface of a first element of a chip, the area including an area that bounds an open cavity. The first element may be the bottom substrate of the chip, or an internal substrate forming, for example, a shelf suspected above the bottom substrate of the chip. The first element may be made of glass or another substance that is selected for its chemical inertness with respect to the material to be encapsulated and for its suitability for the room temperature laser bonding technique to be described below. U.S. Patent Publication No. 2013/0112650 referenced above discussed many materials that may be suitable choices in this latter regard.

At step 104, the material to be encapsulated is introduced to the cavity. At step 106 a second element is placed in contact with the first element at the desired bonding region such that the cavity is closed, forming a chamber. The second element may be the top cover of the chip or an internal cover to be covered in turn at a later stage of chip fabrication. The second element may be made of glass or another suitably inert substance. At step 108, the first and second elements are clamped together in a fixture that may be partially transparent. At step 110, a laser is focused through the first or second element on the desired bonding region. At step 112, laser energy is applied to the desired bonding region to form a hermetic seal around the chamber, enclosing the material.

In some embodiments, where the chip is a flow cell, step 104 may be omitted and step 114 carried out instead, so that the chamber formed by the seal does not initially contain the material of interest, but the material is introduced at a later time, making use of at least one inlet via connected to the chamber. In such a case, the material may be introduced to the chamber subsequently, from another region of the flow cell.

Full details of the technique of room temperature laser bonding that is used in method 100 (implicit in steps 102 and 106-112) are disclosed in patent publication 2013/0112650, referenced above. The advantages of room temperature laser bonding most relevant to the present invention arise from its ability to create hermetic seals between elements comprising relatively inert materials such as glass, without the imposition of high temperatures. Such features are clearly desirable for chambers designed to hold fluids, and also if the material to be encapsulated includes biological material such as living cell cultures.

In some embodiments, instead of step 102 as described above, the heat absorption layer may be applied to an area of the facing surface of the second element before it is placed in contact with the first element, forming the chamber. Steps 104 through 112 (or steps 106 through 114) described above are carried out as before.

Figure 2:
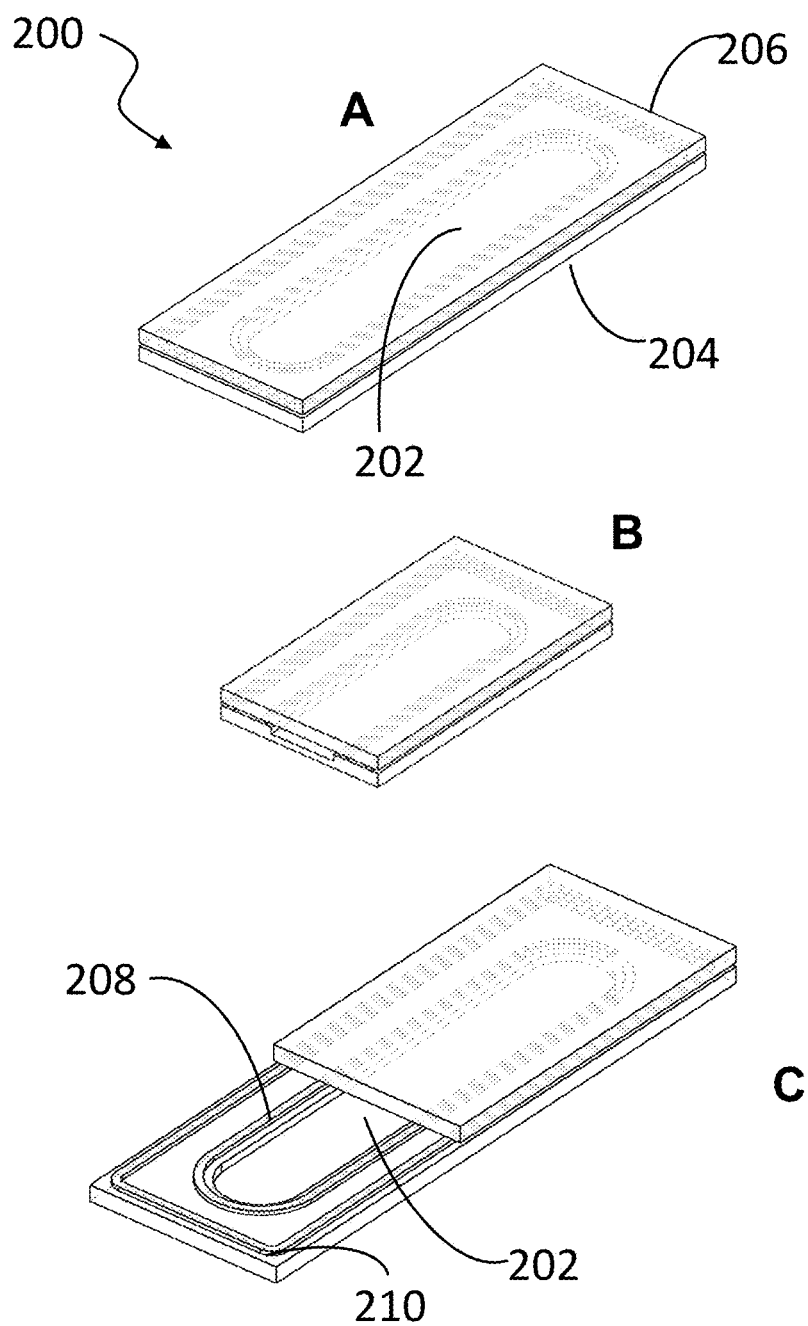
FIG. 2 illustrates three views A, B, and C of a chip fabricated to include a hermetically sealed chamber according to one embodiment.

FIG. 2 illustrates a chip 200 fabricated to include a hermetically sealed chamber according to one embodiment. FIG. 2A shows a view of the entire chip, FIG. 2B shows a cross-section view through its thickness, and FIG. 2C shows a cross section view that omits part of the top substrate 206 to more clearly reveal the inner structure. Chip 200 includes a chamber 202 etched or otherwise formed into the top surface of bottom substrate 204. In the case shown, the chamber takes the form of a simple, roughly oval shape, occupying most of the surface of the chip, with a roughly rectangular cross section, but numerous different shapes and sizes may be envisaged. Top substrate 206 is bonded to bottom substrate 204 with one hermetic seal 208 bounding the chamber 202 and another seal 210, which may be hermetic but need not necessarily be so, bounding the perimeter of chip 200.

It should be noted that the dimensions of seals in FIG. 2 and other Figures in this disclosure are not to be taken as being "to scale", their thicknesses and widths being greatly exaggerated with respect to their length for clarity. Similarly, the thicknesses of the gaps between bonded substrates shown in these Figures have been greatly exaggerated for clarity. In reality, the substrates are in intimate contact with each other when bonded, and any gap is extremely small, if discernable at all.

While many of the embodiments discussed and illustrated in this disclosure concern chambers with dimensions of the order of microns, millimeters or centimeters, fabricated in chips of corresponding size, it is envisaged that the methods and systems described could be beneficially applied to macro-scale devices such as cuvettes, or tanks that could have dimensions of the order of meters.

Figure 3:
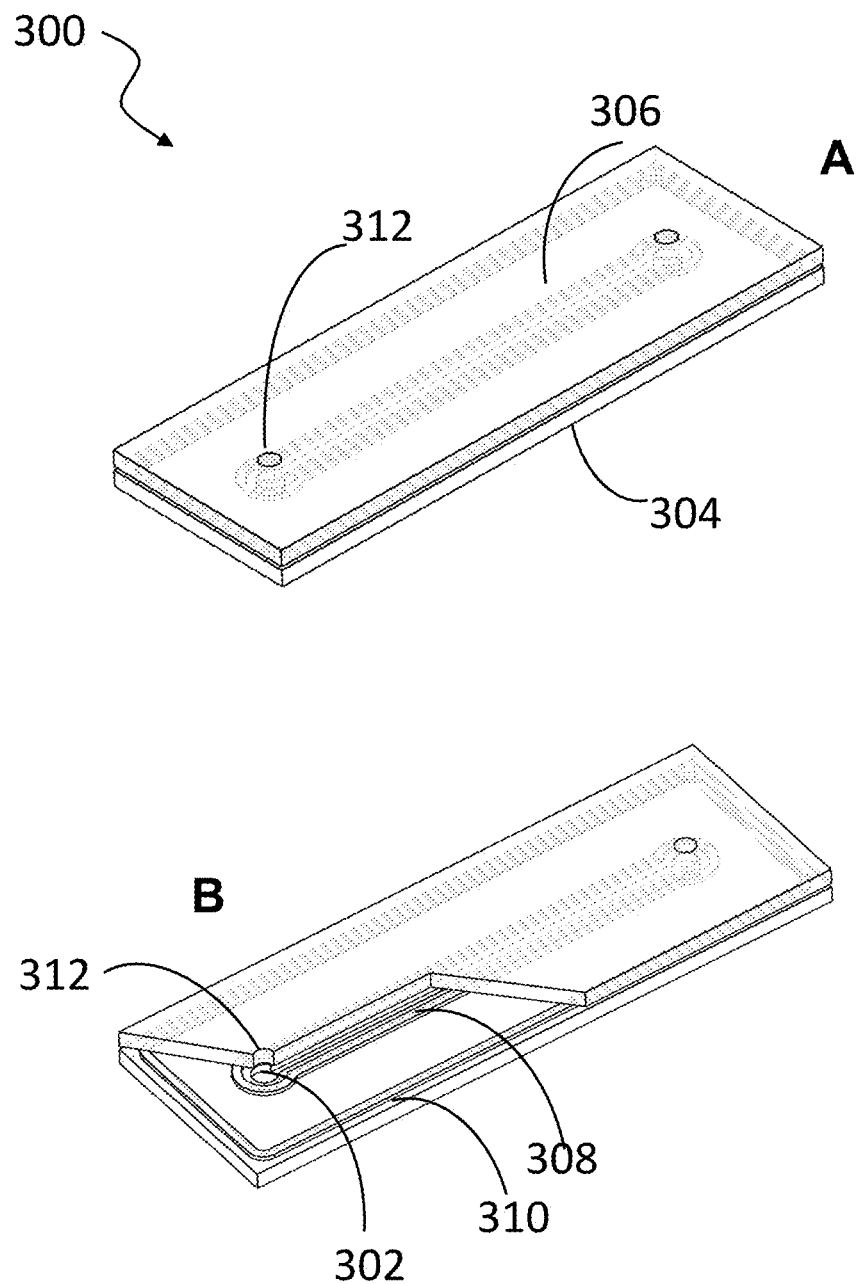
FIG. 3 illustrates two views A and B of a microfluidic chip or flow cell fabricated to include a hermetically sealed chamber and vias according to one embodiment.

FIG. 3 is a cut-away view of a chip 300, fabricated according to another embodiment. FIG. 3A shows a view of the entire chip, and FIG. 3B shows a view that omits part of the top substrate 306 to more clearly reveal the inner structure. Chip 300 has one hermetic seal 308 around chamber 302 and another hermetic seal 310 near the chip edges. In this flow cell embodiment, chamber 302 is shaped as a relatively narrow channel with rounded ends, and top substrate 306 includes two vias 312 at these ends to permit external connections to be made for the passage of a fluid into or out of the chamber. In some embodiments, vias may be present in bottom substrate 304 additionally or instead of top substrate 306. In some embodiments there may be only one via, or more than two.

In the embodiment shown in FIGS. 1 and 2, two separate seals are present. In some embodiments, there may be only one seal bounding the chamber, that one seal being hermetic.

Figure 4:
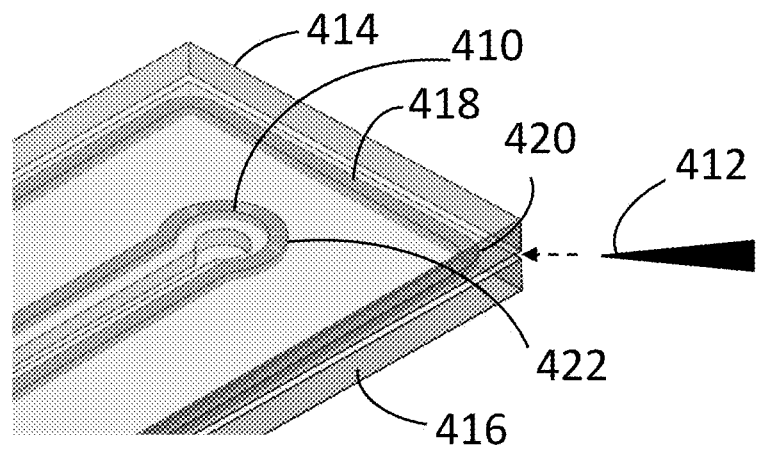
FIG. 4 illustrates a method of breaking open a hermetic seal around an on-chip chamber according to one embodiment.

FIG. 4 illustrates a method of breaking open a hermetic seal 410, previously formed around encapsulated material, or around an empty cavity in a flow cell, by a method such as method 100, according to a first embodiment. A tool 412, typically one with a fine edge or a tipped point as shown, is inserted between the portions of the sealed first and second elements 414, 416 that slightly project beyond seal 418, at or very close to bond interface 420. A controlled mechanical force is applied by tool 412 to create sufficient tensile stress at bond interface 420 of seal 418 and in turn at bond interface 422 of hermetic seal 410 to overcome the strength of both seals. In some cases, hermetic seal 410 may be the only seal present.

In some embodiments, the tool may be moved relative to the chip to traverse a portion of or the entire perimeter of the seal around the chamber or chip. The tool may be operated in a simple manual fashion or with the use of an apparatus, not shown, designed to more conveniently apply the necessary mechanical force. In some embodiments, such an apparatus includes a fixture in which the chip is held, and an actuation mechanism which when actuated will position one or more tools at or in the vicinity of the bond interface and move them in a controlled path to break through the seal. In some embodiments, it may not be necessary to move the tool after placing it in position. In some embodiments, the breaking of the seal by manual or other means results in the complete separation of elements 414 and 416. If elements 414 and 416 are the top and bottom substrates of a chip, the entire chip may be cleanly separated into two parts enabling access or recovery of the contents of the chip.

One example of a suitable tool 412 is a razor blade. Other examples include wedges or other knife-like tools. In some embodiments, the tool may be operated, manually or in combination with an apparatus as described above, to apply a shear stress rather than a tensile stress to achieve the same objective of breaking open the hermetic seal. In some embodiments, the tool may be operated to cause the unbonding of the hermetic seal without any contact occurring between the tool and any material within the chamber.

Figure 5:
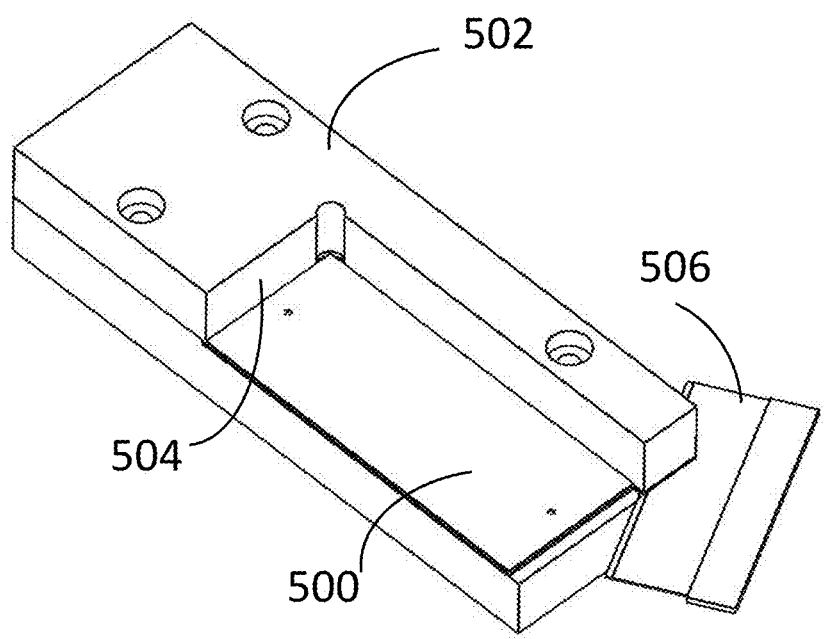
FIG. 5 illustrates an apparatus that facilitates the opening of an on-chip hermetic seal according to one embodiment.

FIG. 5 illustrates one embodiment of a simple apparatus, essentially a fixture 502, including a cavity 504 into which the chip 500 to be unsealed is inserted, and an opening, shown at the front right edge of the Figure, precisely shaped to accept a razor blade 506 and positioned so that the blade 506 can be inserted at a suitable position to stress and break the hermetic seal of interest in the chip.

Figure 6:
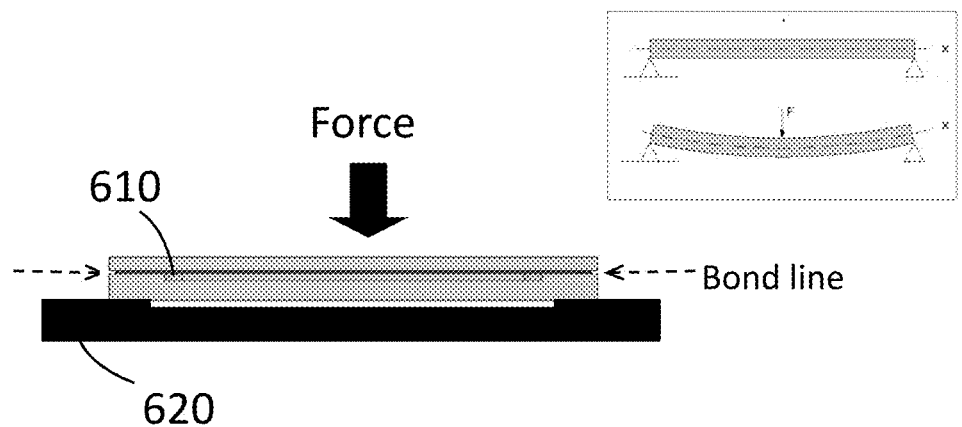
FIG. 6 illustrates a method of breaking open a hermetic seal around an on-chip chamber according to one embodiment.

FIG. 6 illustrates a method of breaking open a hermetic seal 610, previously formed around encapsulated material by a method such as method 100, according to one embodiment. The sealed chip is coupled to a fixture 620 such that a neutral axis X is located at a predetermined distance from the "bond line" characterizing seal 610. A precisely controlled force, low enough to avoid the risk of breaking the bulk material of the chip, but high enough to cause the required shear stress at the bond line to break the seal open, is then applied to the chip. In the embodiment illustrated, the force is applied orthogonally to the plane of the seal, causing the chip to bend as indicated schematically in the Figure inset. In some embodiments, the bending may be carried out without the aid of a fixture, but precise control may be more difficult to achieve.

Figure 7:
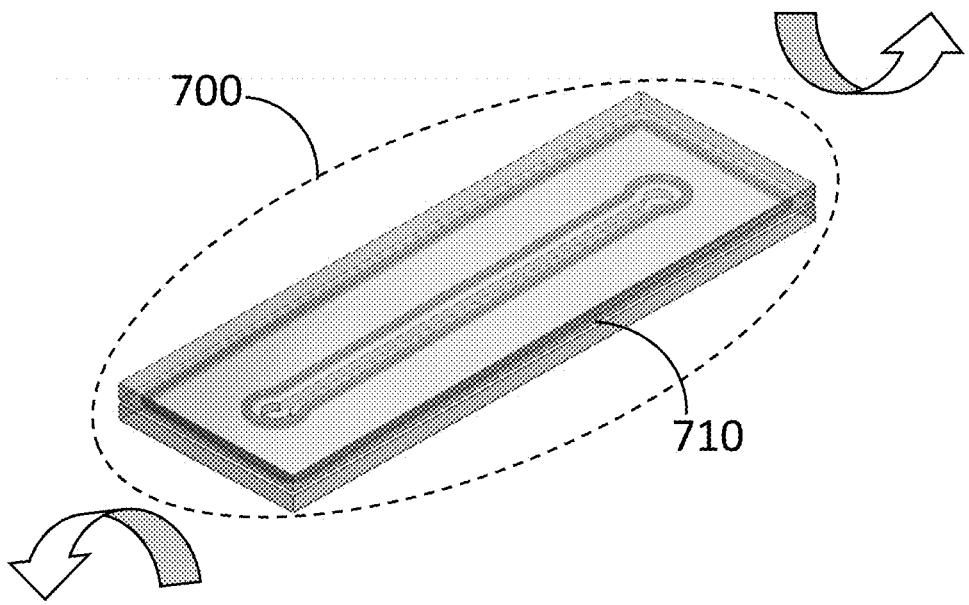
FIG. 7 illustrates a method of breaking open a hermetic seal around an on-chip chamber according to another embodiment.

FIG. 7 illustrates a method of breaking open a hermetic seal, previously formed around encapsulated material or flow cell by a method such as method 100, according to another embodiment. Opposing ends of chip 700 are twisted in opposite directions as indicated by the curved arrows. Such twisting motion causes shear stresses at seal 710. The directions of the twist may be reversed, and the to and fro twist cycle repeated as necessary until the seal is opened. In some embodiments the twisting is carried out manually. In some embodiments a fixture or other apparatus may be used instead of or in addition to manual twisting.

Figure 8:
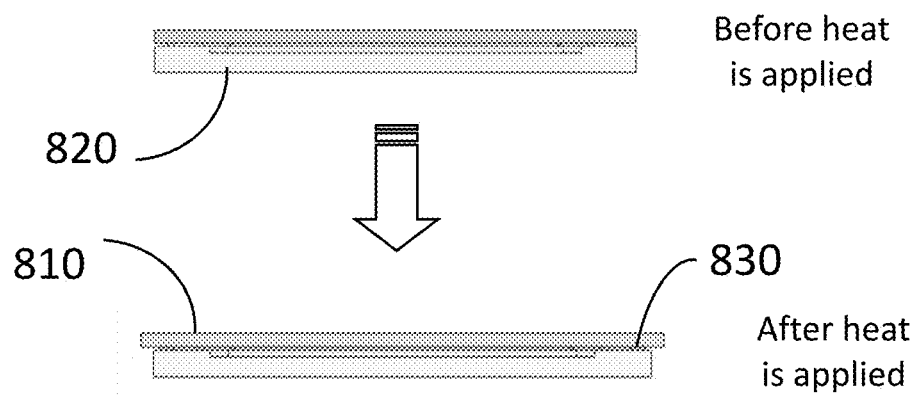
FIG. 8 illustrates a method of breaking open a hermetic seal around an on-chip chamber according to yet another embodiment.

FIG. 8 illustrates a method of breaking open a hermetic seal, previously formed around encapsulated material or flow cell by a method such as method 100, according to yet another embodiment. In this embodiment, a thermal technique is employed. Thermal techniques may be used when the two chip elements that have been bonded, or other elements coupled to those bonded elements, have been selected to have coefficients of thermal expansion (CTEs) that differ by a predetermined amount. In response to a thermal change, (typically the application of heat) the dimensions of these elements will change at rates sufficiently different to cause shear stress at the bond interface that results in the breaking of the seal. In the case illustrated, in response to the application of heat, top substrate 810 expands more than bottom substrate 820, clearly putting shear stress on seal 830 between the two substrates.

Figure 9:
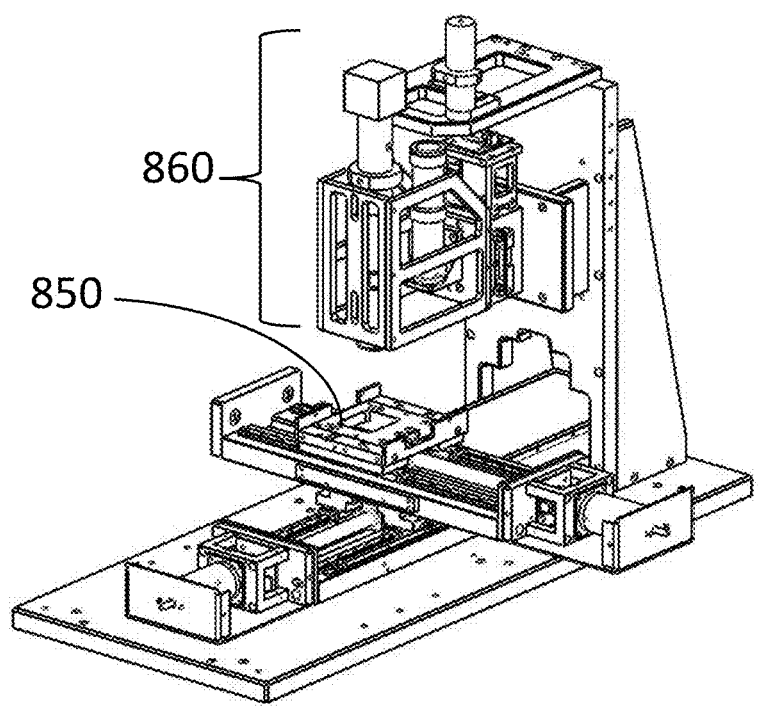
FIG. 9 illustrates an apparatus that facilitates the opening of a hermetic seal around an on-chip chamber according to one embodiment.

In some embodiments, the heat is applied with a source of electromagnetic radiant energy, such as an infrared (IR) beam. The radiant energy may be applied in a diffuse or localized, directed manner. In some embodiments a chip fixturing and laser translation system similar to those systems used to carry out room temperature laser bonding may be used to apply the laser energy with precise control to "unbond" seals rather than creating seals. FIG. 9 shows one example of an apparatus of this sort. The chip to be unsealed (not shown) would be positioned on the x-y stage 850 and a laser beam would be guided though the optical system to focus on the chip at the bond interface of interest. Translating the chip and/or the beam allows the length of a seal to be tracked, or a series of sealed sites over the surface of the chip to be addressed as desired. In some embodiments, where the piece to be unbonded remains stationary the laser beam can traverse the chip through the use of moving mirrors in a scanner system. In other embodiments, a combination of stage movement and laser scanning can be employed.

In some embodiments, the heat may be applied by a more conventional heating element, using conduction or convection. In one embodiment of this bond "disassembly" method, electrical resistance heating may be used to separate the bond. The heat absorption layer, typically a thin metal film, used to create the bond, can also be used as a conductive lead, and patterned as necessary around the bond line, such that passing an electric current through the lead creates localized resistive heating which cleaves the bond.

Figure 10:
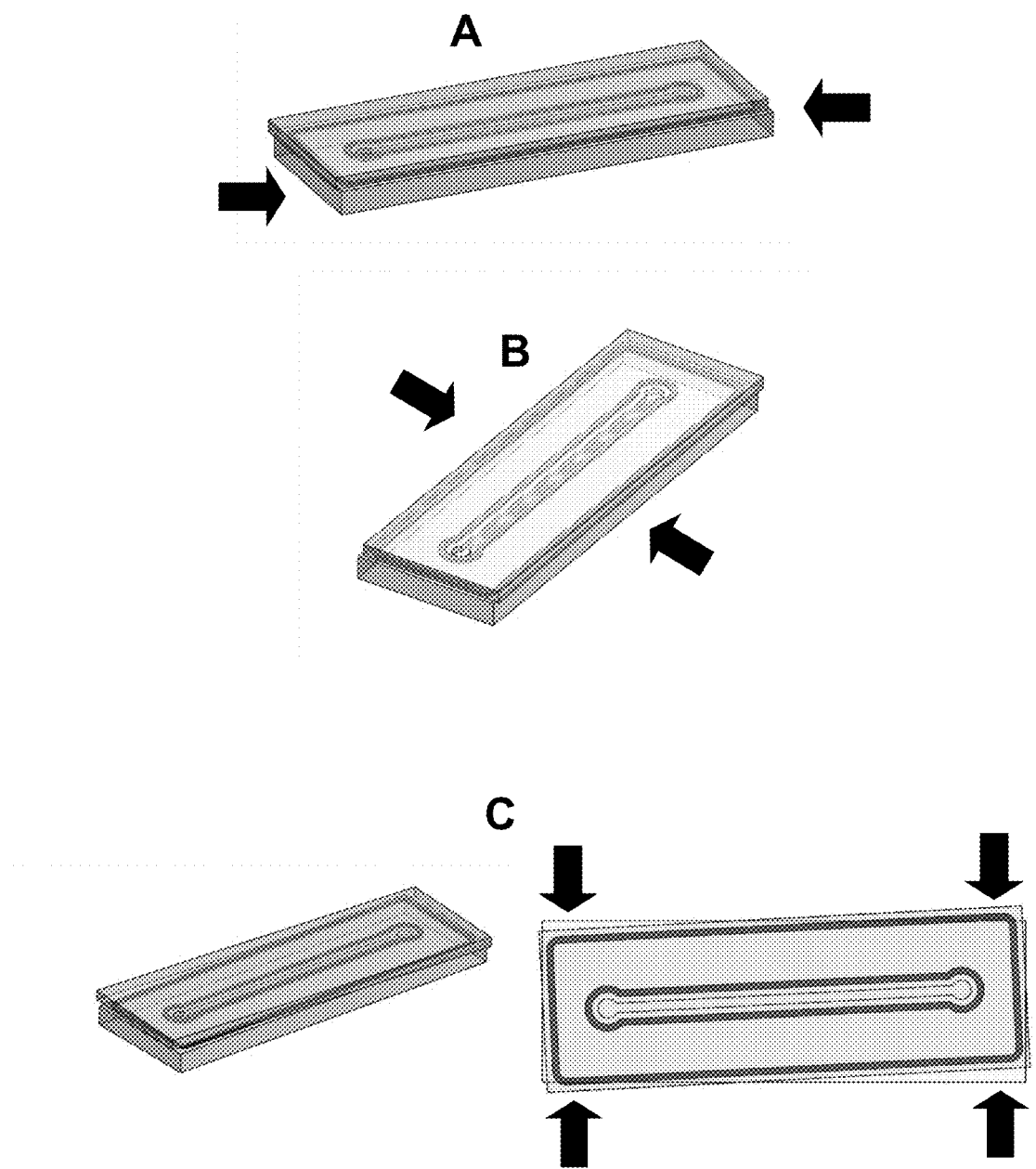
FIG. 10 illustrates chips including features that facilitate the opening of the hermetic seal according to three related embodiments A, B and C.
Figure 11:
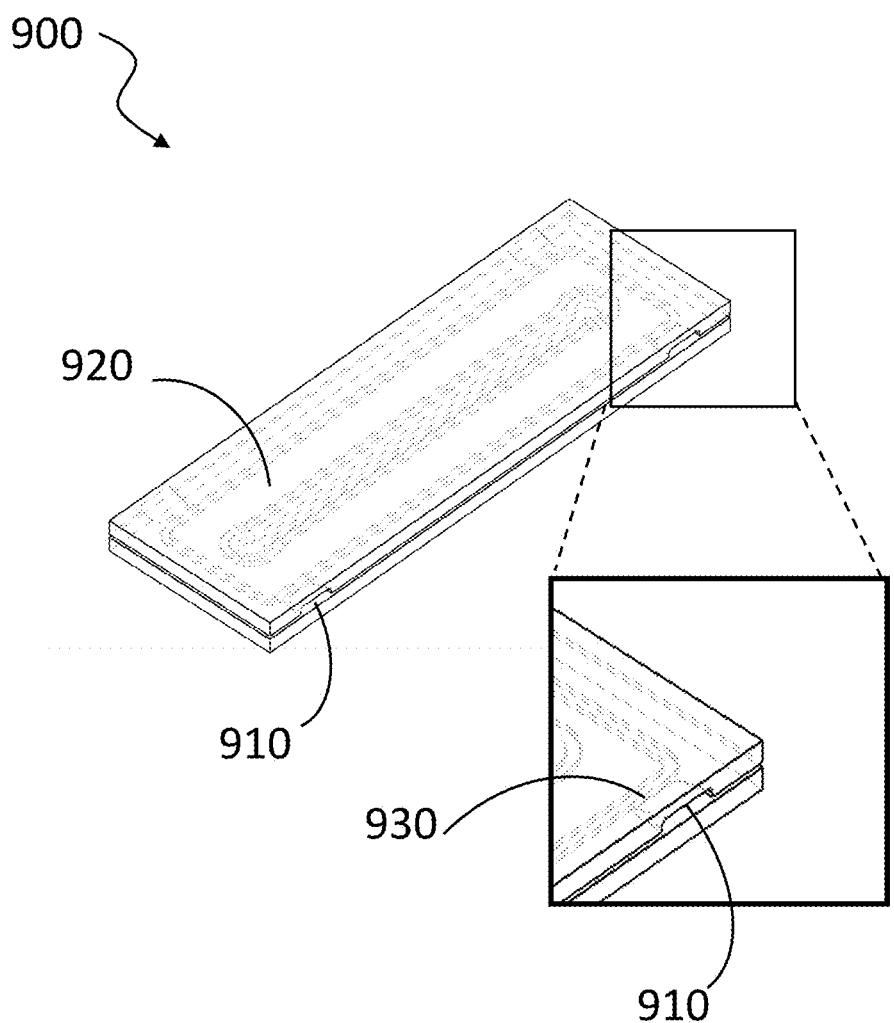
FIG. 11 illustrates a chip including features that facilitate the opening of the hermetic seal according to one embodiment.

FIGS. 10 and 11 relate to methods of breaking open a hermetic seal, previously formed around encapsulated material on a chip or flow cell by a method such as method 100, according to yet other embodiments. In these cases, generally involving mechanical techniques such as those described above with respect to the embodiments illustrated in FIGS. 4 through 7, the breaking of the seal is facilitated by the presence of structural features deliberately included in the chip for that purpose.

In the embodiment illustrated in FIG. 10A, the feature in question is an intentional longitudinal alignment offset in the two bonded elements of the chip, which makes it easy to apply an opposing force to the substrates (typically by compression or squeezing as indicated by the opposing arrows) which generates a shear stress sufficient to cleave the bonds. In the embodiments of FIGS. 10B and 10C, the alignment offsets are lateral and tilt/skew respectively. In the former case, simply compressing the chip by applying lateral force at two opposing positions as indicated by the arrows causes sufficient shear stress to cleave the bond; in the latter case, applying compressive lateral force at both ends of the chip causes sufficient shear stress to cleave the bond.

FIG. 11 illustrates a chip 900 into which the features facilitating bond disassembly are undercuts. Four undercuts 910 have been fabricated into the top substrate 920. Each undercut is angled inward, having a larger opening on the outer edge of the chip converging to a smaller opening as it approaches the bond interface 930 of the outer seal. The purpose of the undercuts is to make it easy to insert a tool directly in a favorable position and orientation to stress that bond interface, and, in the case shown, the bond interface of the inner seal in its turn. In other embodiments, similar undercut features may be fabricated into the bottom substrate instead of or in addition to the top substrate. In some embodiments, the undercuts may have shapes other than the angled wedges shown. In some embodiments the undercuts may have shapes designed to accommodate a particular tool or type of tool. In one embodiment, the chip feature facilitating bond disassembly is a chamfer, extending around the entire perimeter of the chip.

Figure 12:
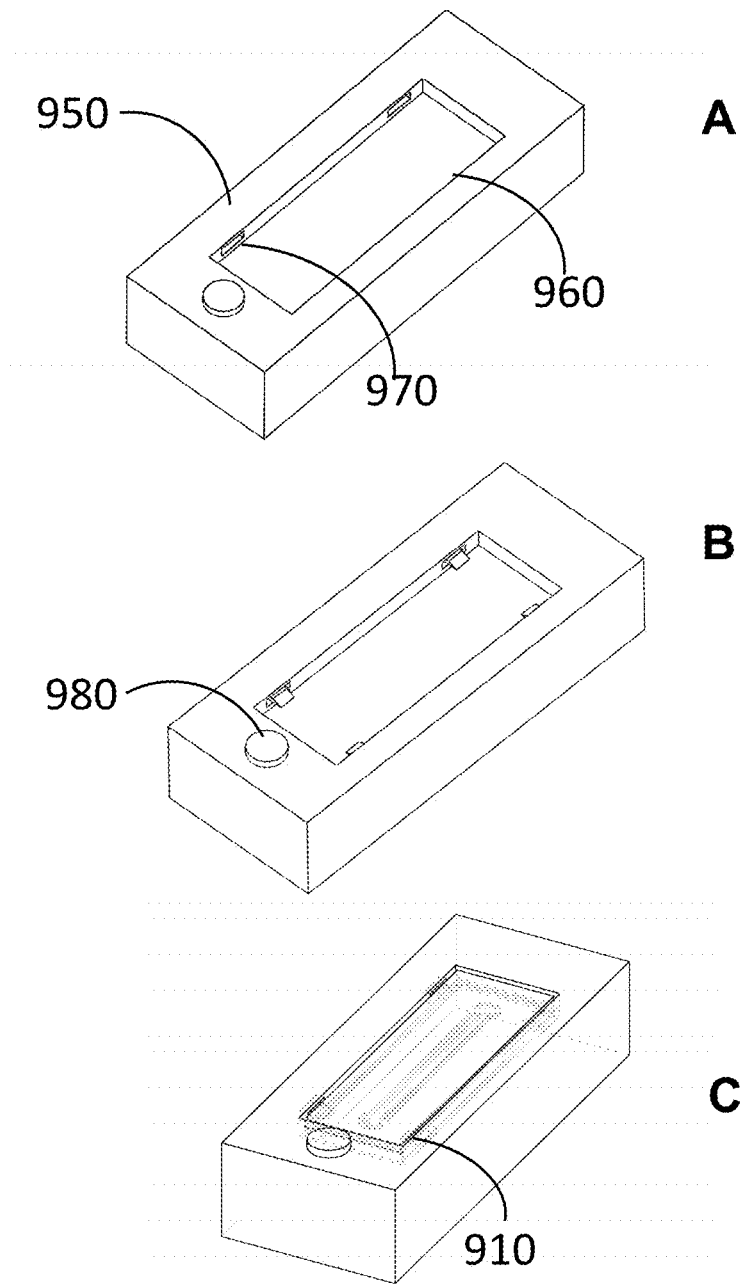
FIG. 12 illustrates an apparatus for unbonding the hermetic seal in the chip of FIG. 11 according to one embodiment.

FIG. 12 illustrates one embodiment of an apparatus that can be used for unbonding hermetic seals in a chip such as chip 900, having undercut features 910, using a fixture 950 including a cavity 960 into which the chip to be unsealed (shown in FIG. 12C) may be inserted. FIG. 12A is a view of the fixture prior to the insertion of the chip, showing tools 970 in a retracted position. FIG. 12B shows tools 970 in an extended position, in response to a user pressing button 980. FIG. 12C is a view of the fixture after chip 900 has been inserted into cavity 960. Pressing button 980 with the chip in place as shown causes tools 970 to engage with undercuts 910, creating stress at multiple positions simultaneously around the perimeter of the sealed chip, resulting in the unbonding of the seal or seals.

The embodiments disclosed above have been generally described, for the sake of simplicity, in terms of a seal that bonds two parts of a chip together around an encapsulated material such that when the seal is subsequently broken, the chip is cleaved in two, exposing the enclosed material. However, in some embodiments, the methods and aspects of the present invention may be applied with respect to forming and opening one or more encapsulation chambers within a multi-substrate chip. In such cases, an individual chamber or reservoir can be opened independently of the opening of any other chamber on the chip, and independently of the bond sealing the two external substrates together.

In some microfluidic chip embodiments, for example, an encapsulation chamber may be a reservoir containing a fluid (which can be under pressure) or any other type of reagent that can be released into a channel connecting the chamber to another portion of the chip. The released material may then be subjected to a mixing process, and/or added to another released fluid. It may be directed to flow in a predetermined direction to another portion of the chip. In such embodiments, the material release mechanism can be any of the mechanical or thermal techniques described previously.

Figure 13:
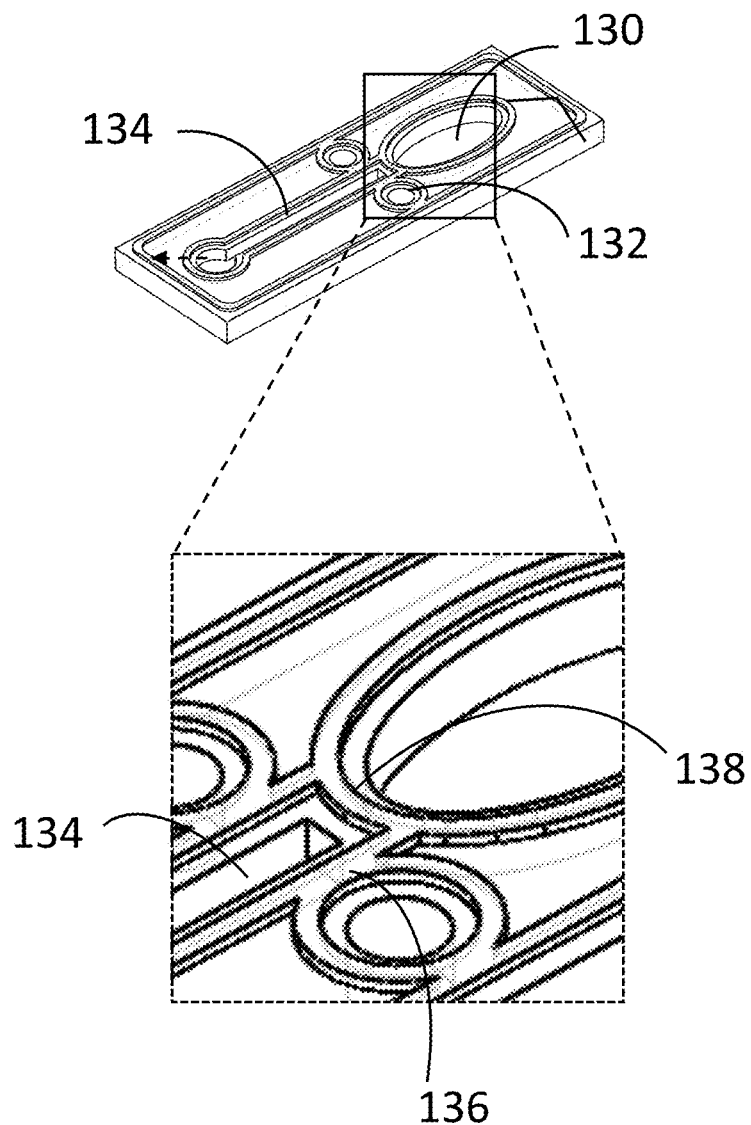
FIG. 13 illustrates a microfluidic chip with primary and secondary chambers that can be opened according to some embodiments.

FIG. 13 illustrates a microfluidic chip having a primary chamber 130, a secondary chamber 132, and a channel 134 in an intermediate position. According to one embodiment, seal 136 between secondary chamber 132 and channel 134 may be broken by increasing the temperature of fluid encapsulated in secondary chamber 132, Thermal expansion then increases the fluid pressure and forces the fluid to break through seal 136 and enter channel 134. A very small opening may be made in seal 138 between primary chamber 130 and channel 134 using a thermal technique, for example by using a focused laser beam. Alternately, pressure exerted on seal 138 from the pressurized fluid forced out of the secondary chamber 132 may create the desired opening. In either if these two cases, an opening may be created that is large enough to allow fluid from primary chamber 130 to enter channel 134, but small enough to ensure that that passage of fluid only occurs in response to deliberately increased pressure from within the primary chamber. In other words, the opened seal 138 may act as a valve, allowing fluid previously encapsulated within the main chamber to be "dispensed" in controlled doses by applying pressure to the primary chamber.

Figure 14:
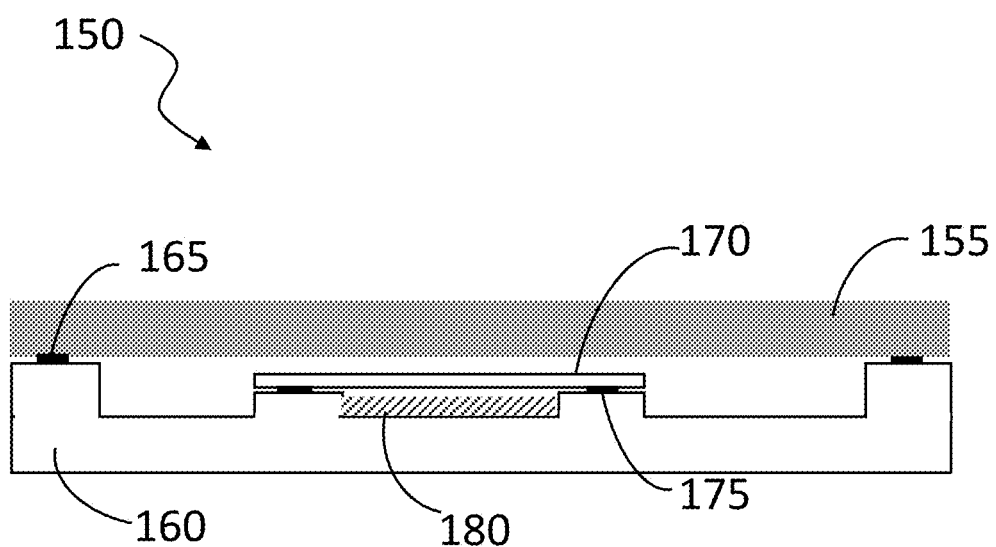
FIG. 14 illustrates a multi-substrate microfluidic flow cell including an internal chamber according to one embodiment.

FIG. 14 illustrates a multi-substrate chip according to one embodiment. Microfluidic chip 150 includes a top substrate 155 and a bottom substrate 160 bonded at hermetic seal 165 to define a chip interior volume. Chip 150 also includes an inner substrate 170 bonded at hermetic seal 175 to raised features on bottom substrate 160 to define a chamber containing fluid 180. Seal 175 can be broken in a controlled fashion when required, allowing fluid 180 to be released from the chamber, possibly by capillary action or bulk pressure-driven flow, while seal 165 may remain intact, protecting the contents of chip 150 from the external environment. Substrates 155 and 160, and 170 typically comprise glass, but may comprise any other material that is chemically inert with respect to fluid 180. This chemical stability coupled with the hermeticity and mechanical robustness of the seals makes such embodiments of the current invention particularly desirable.

Figure 15:
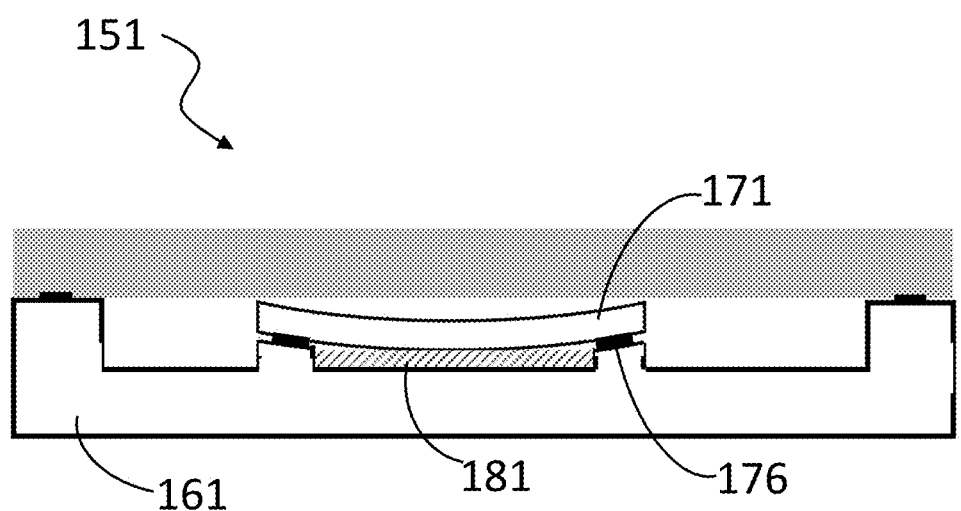
FIG. 15 illustrates a multi-substrate microfluidic flow cell including an internal chamber according to another embodiment.

FIG. 15 illustrates a multi-substrate microfluidic chip 151 according to another embodiment. This differs from chip 150 in having its inner substrate 171 bonded in a bent configuration at hermetic seal 176 to bottom substrate 161. This "locked-in" bend means that energy is trapped in substrate 171, held in check by the strength of the seal, but when the seal is opened, using any of the techniques discussed above, substrate 171 will "spring" away from its bound position, allowing fluid 181 an easy exit from the chamber into surrounding portions of the chip.

In some embodiments, a multi-substrate chip may include one hermetically sealed outer chamber that encapsulates more than one hermetically sealed inner chamber. The seals of each may be independently broken open as and when desired using any of the release techniques described above, allowing, for example, material enclosed within one chamber to be released into a flow channel, to undergo some process, and then to flow into a second chamber containing other material so that mixing occurs. In such an example, it may be desirable to subsequently unbond a seal between the second chamber and another channel of the chip, and so on. Finally, the hermetic seal of the outer chamber may be opened up to allow access to all the encapsulated materials.

Embodiments described herein provide various benefits. In particular, embodiments provide for the room temperature formation of hermetic seals, forming compact, chemically inert enclosures for materials within chips, while ensuring that those materials may be subsequently accessed, released, or otherwise managed on the chip, by the carefully controlled breaking of one or more seals. These benefits may be especially valuable in applications where sensitive biological materials are involved.

The above-described embodiments should be considered as examples of the present invention, rather than as limiting the scope of the invention. Various modifications of the above-described embodiments of the present invention will become apparent to those skilled in the art from the foregoing description and accompanying drawings. Accordingly, the present invention is to be limited solely by the scope of the following claims.

The invention claimed is:

1. A chip comprising:
a first hermetic seal bonding a first element and a second element to create a first inner chamber; and
a second hermetic seal bonding a third element and a fourth element to create a second outer chamber encapsulating the first inner chamber;
wherein the first hermetic seal is configured to be broken open independently of the second hermetic seal by the application of a mechanical or thermal technique.

2. The chip of claim 1 wherein the chip is a microfluidic chip and the first chamber is configured to hold a fluid.

3. The chip of claim 2 further comprising a via connected to the first chamber.

4. A microfluidic chip comprising:
a first hermetic seal bonding a first element and a second element to create a first chamber configured to hold a fluid; and
a second hermetic seal bonding a third element and a fourth element to create a second chamber encompassing the first chamber;
wherein the first hermetic seal is configured to be broken open independently of the second hermetic seal by the application of a mechanical or thermal technique; and
wherein the first hermetic seal holds the first element in a bent configuration such that if the first hermetic seal is broken to form an opening in the first chamber, mechanical energy within the first element is released, increasing the size of the opening such that the fluid may easily exit the first chamber.

5. A microfluidic chip comprising:
a hermetic seal bonding a first element and a second element to create a chamber within the chip, the chamber being configured to hold a fluid;
wherein the hermetic seal is configured to be broken open under controlled conditions using a release technique; and
wherein the structural feature comprises an undercut at or in close proximity to the bond interface, the undercut configured to accept the insertion of a tool to break open the hermetic seal.

6. A microfluidic chip comprising:
a hermetic seal bonding a first element and a second element to create a chamber within the chip, the chamber being configured to hold a fluid;
wherein the hermetic seal is configured to be broken open under controlled conditions using a release technique; and
wherein the first element is characterized by a first coefficient of expansion and the second element is characterized by a second coefficient of expansion different from the first such that in response to a thermal change, the dimensions of these elements will change at rates sufficiently different to cause shear stress at the bond interface that results in the breaking of the hermetic seal.

* * * * *